(12) United States Patent
Price et al.

(10) Patent No.: US 7,101,818 B2
(45) Date of Patent: Sep. 5, 2006

(54) ENHANCED ENERGY ABSORBING MATERIALS

(75) Inventors: Allen L. Price, Rising Sun, MD (US); David F. Erb, Jr., Readfield, ME (US); Eric D. Ritter, Monmouth, ME (US)

(73) Assignee: Tex Tech Industries, Inc., North Monmouth, ME (US)

( * ) Notice: Subject to any disclaimer, the term of this patent is extended or adjusted under 35 U.S.C. 154(b) by 88 days.

(21) Appl. No.: 10/658,550

(22) Filed: Sep. 10, 2003

(65) Prior Publication Data

US 2004/0132368 A1    Jul. 8, 2004

Related U.S. Application Data

(60) Provisional application No. 60/409,225, filed on Sep. 10, 2002.

(51) Int. Cl.
*B32B 5/026*    (2006.01)
*B32B 5/006*    (2006.01)

(52) U.S. Cl. .............. 442/268; 442/270; 442/278; 442/283; 442/271; 428/911

(58) Field of Classification Search .......... 442/268, 442/402, 403, 271, 135, 270, 255, 276, 278, 442/283; 428/219
See application file for complete search history.

(56) References Cited

U.S. PATENT DOCUMENTS

| | | | |
|---|---|---|---|
| 3,829,939 A | 8/1974 | Dilo | |
| 5,388,320 A | 2/1995 | Smith et al. | |
| 5,440,965 A * | 8/1995 | Cordova et al. | 89/36.02 |
| 5,660,913 A * | 8/1997 | Coppage, Jr. | 428/102 |
| 5,989,375 A | 11/1999 | Bortz | |
| 6,026,509 A | 2/2000 | Bachner, Jr. | |
| 6,248,676 B1 | 6/2001 | Dischler | |
| 6,266,819 B1 | 7/2001 | Bachner, Jr. | |
| 6,268,301 B1 | 7/2001 | Dalman et al. | |
| 6,276,255 B1 | 8/2001 | Field et al. | |
| 6,405,417 B1 | 6/2002 | Sheehan et al. | |
| 2003/0022583 A1* | 1/2003 | Thomas et al. | 442/403 |
| 2004/0112206 A1 | 6/2004 | Ramkumar | 89/36.02 |

\* cited by examiner

*Primary Examiner*—Terrel Morris
*Assistant Examiner*—Lynda Salvatore
(74) *Attorney, Agent, or Firm*—Fitzpatrick, Cella, Harper & Scinto

(57) ABSTRACT

Dense, highly stable, high performance ballistic material comprises at least one woven layer of ballistic grade fiber (preferably a stack of such layers) and at least one nonwoven layer of fabric which is entangled with the woven or unidirectional layer by needle felting. The resulting core material does not require assembly of individual woven layers during subsequent manufacture of ballistic articles and exhibits excellent ballistic performance at low areal densities and thicknesses.

17 Claims, 2 Drawing Sheets

ENHANCED ENERGY ABSORBING MATERIALS

This application claims the benefit of priority under 35 U.S.C. §119(e) of U.S. Provisional Application No. 60/409,225, filed Sep. 10, 2002 and herein incorporated by reference.

BACKGROUND OF THE INVENTION

1. Field of the Invention

The invention relates to enhanced energy absorbing materials and methods of making them. The materials have utility in the manufacture of ballistic vests, hard and soft armor, life protective systems, and anti-ballistic systems.

2. Description of the Prior Art

Materials made from ballistic grade fibers are known in the art, such as the well known aramid fiber-based material sold under the tradename Kevlar®. Methods of processing these materials into finished articles are also known. Ballistic fiber materials, ballistic vest constructions and other materials and methods are described, for example, in U.S. Pat. Nos. 6,276,255; 6,268,301; 6,266,819; 6,248,676; and 6,026,509, which are incorporated by reference. The materials and methods described in these United States Patents may be used, without limitation, in combination with the novel aspects of the invention described herein.

Needle felting, sometimes referred to herein as needle punching or simply needling, is a process used in the textile industry in which an element such as a barbed needle is passed into and out of a fabric to entangle the fibers. Needle felting itself is not new, and is described for example in U.S. Pat. Nos. 5,989,375; 5,388,320; 5,323,523; 3,829,939; and 6,405,417, all of which are incorporated by reference herein.

The use of quasi-unidirectional fabric layers in ballistic materials is known. For example, a quasi-unidirectional fabric is commercially available from Barrday Inc. of Cambridge Ontario, Canada under the trade name Sentinel®. This fabric comprises at least two unidirectional fabric layers cross-laid in a 0/90 configuration relative to each other. These ballistic resistant yarns are woven into a second fabric composed of yarns having substantially lower tenacity and tensile modulus than the ballistic cross-laid yarns to hold the ballistic yarns in place. This method of construction, in theory, forms a fabric substantially stronger than conventional woven materials due to the lack of bending in the ballistic resistant yarns that results from a traditional weaving operation. However, there is a limitation in the performance of such materials due to the inherent lack of stability in the structure. Because the ballistic yarns are not secured in position during a ballistic event, they will spread and allow passage through the interstices by a projectile.

Thus, there continues to be a need for fabrics with high ballistic resistant performance in a dense, compact format which can be conveniently manufactured.

SUMMARY OF THE INVENTION

In one aspect, the invention is a ballistic material comprising at least one woven layer of ballistic grade fiber and at least one nonwoven layer of fabric, said nonwoven layer entangled with the woven layer in a direction substantially perpendicular to an x-y plane of the ballistic material, preferably by a needle felting process. As used herein, "woven" includes unidirectional and quasi-unidirectional fabrics.

The invention may be embodied as a stack of woven layers (such as the quasi-unidirectional Sentinel® fabric mentioned above) and a nonwoven layer which is attached to and entangled with the stack of woven layers on one or both faces to form an integral structure having an areal density of about 0.07 pounds per square foot (342 g/m$^2$) to about 10 pounds per square foot (48.8 kg/m$^2$). The resulting integral structure offers advantages in handling and subsequent manufacturing because the material is ready-to-use and does not require assembly of individual ballistic fabric layers.

In another aspect, the invention is a method of making a ballistic material which comprises the steps of superposing a nonwoven fiber layer on a ballistic grade woven fiber layer or layers to form a stack, and subjecting the stack to needle felting until the fiber layers are attached and fibers of the nonwoven layer are entangled in interstices of the woven layer or layers.

DETAILED DESCRIPTION OF THE INVENTION

Figure 1:
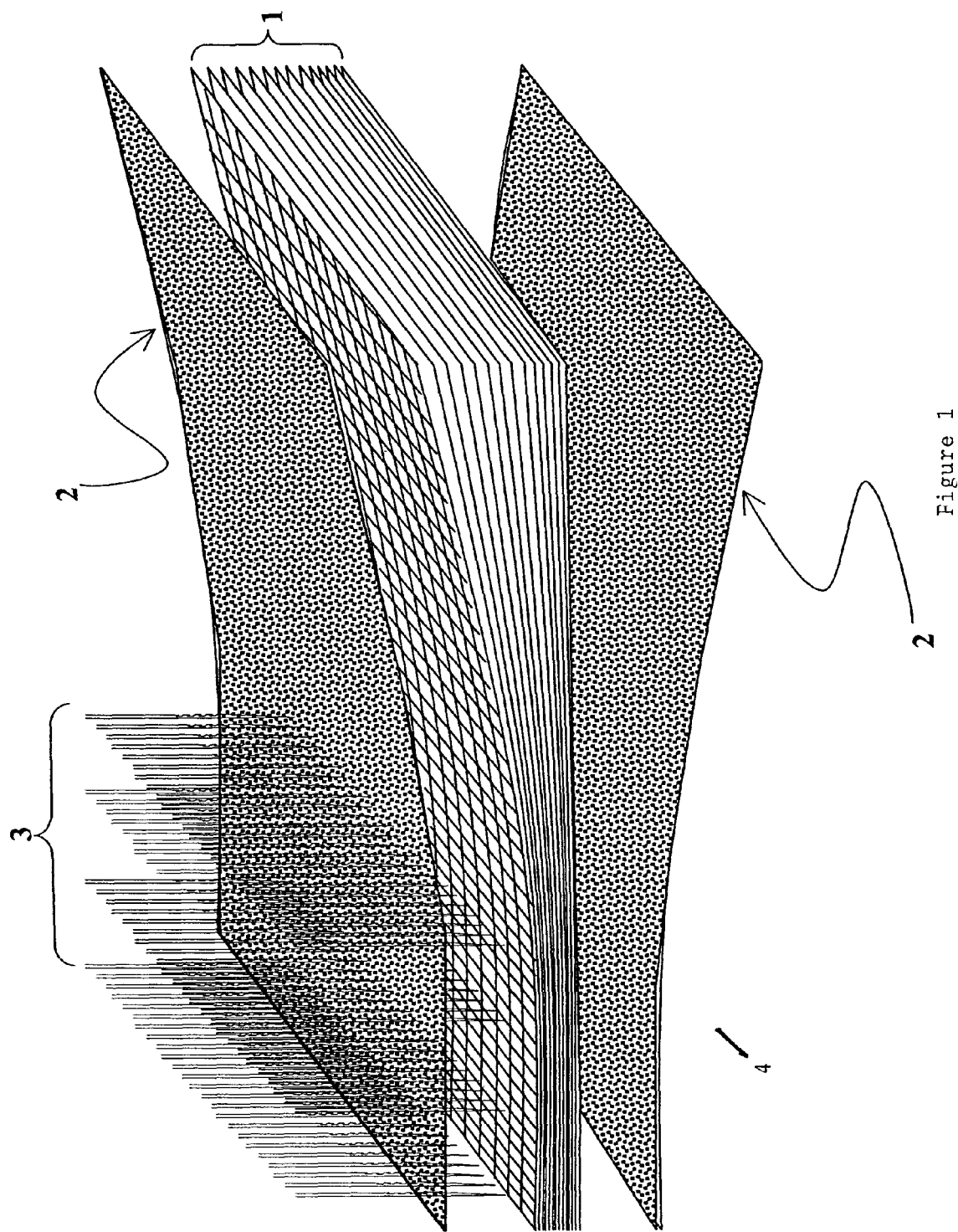
FIG. 1 is an exploded view of a ballistic material showing nonwoven layers, layers of ballistic grade material, and a graphical representation of the needle felting elements.

Referring to FIG. 1, ballistic material (4) according to the invention extends generally in the x-y plane. At least one and preferably a stack of layers (1) comprises ballistic grade woven fabrics, such as layers of unidirectional fiber tows or yarns. If unidirectional tows or yarns are used, these are preferably cross-laid at 90 degree angles with respect to one another and held in place by lightly stitching, sewing or interweaving lightweight yarns such that the material remains manageable during the manufacturing processes without separating and without bending the individual tows or yarns.

In a unidirectional fabric the tows all run in the same direction. In a quasi-unidirectional fabric the tows may be laid in more than one direction. As used herein, "unidirectional" encompasses both unidirectional and quasi-unidirectional fabric, unless the context requires otherwise.

Fabrics woven from ballistic fibers in a variety of weave styles including plain, basket, twill, satin and other complex weaves including, but not limited to, unidirectional, quasi unidirectional, and three dimensional materials, alone or in combination, can be used as the woven layers. As used herein "woven" fabrics includes stitched tows and knits. A plurality of knitted layers or stitched tows may be used with the invention.

In preferred embodiments, stack of layers (1) comprises multiple layers of quasi-unidirectional fabric such as that commercially available from Barrday Inc. of Cambridge Ontario, Canada, under the trade name Sentine®. This material is a fabric having unidirectional ballistic resistant yarns in at least two layers cross-laid at ninety degree angles relative to each other. The ballistic resistant yarns are then held in place by being woven in a second fabric composed of yarns having substantially lower tenacity and tensile modulus than the ballistic cross-laid yarns. Alternatively, the layer(s) (1) may simply be woven ballistic grade fibers such as Kevlar® (para-aramid fibers), poly (p-phenylene-2,6- benzobisoxazole) (PBO), Spectra® (high molecular weight polyethylene fibers) or ballistic nylons.

The ballistic grade layer(s) (1) is combined with nonwoven batting layers (2) or sandwiched between layers of nonwoven batting material. After aligning the material, the stack is subjected to a needle felting process to attach the layers to each other, increase the density and stabilize the finished fabric.

In a preferred embodiment of the present invention, the nonwoven layer is composed of a high performance ballistic resistant fiber, especially a ballistic resistant fiber having a tenacity of at least 15 grams per denier (13.5 g/decitex) and a tensile modulus of at least 400 grams per denier (360 g/decitex) (hereinafter "ballistic grade nonwoven fibers"). The nonwoven layer may be selected from natural fibers and synthetic fibers. Natural fiber includes cotton, wool, sisal, linen, jute and silk. Synthetic fiber includes aramid fibers, extended chain polyethylene fibers, PBO fibers, regenerated cellulose, rayon, polynosic rayon, cellulose esters, acrylics, modacrylic, polyamides, polyolefins, polyester, rubber, synthetic rubber, saran, glass, polyacrylonitrile, acrylonitrile-vinyl chloride copolymers, polyhexamethylene adipamide, polycaproamide, polyundecanoamide, polyethylene, polypropylene and polyethylene terephthalate. It is possible to use non-ballistic grade nonwoven fibers for the nonwoven layer and still produce a material having satisfactory ballistic performance for some applications.

The needle felting step stabilizes the fabric layers and prevents the individual tows from separating. In a preferred embodiment, the nonwoven layer(s) (2) comprises ballistic grade staple fibers, and the needle felting step entangles these fibers in the interstices of the woven fabric or cross-laid tows or yarns so that some are in a direction substantially perpendicular to the x-y plane of the fabric and mechanically connects the fabric plies. This mechanical bond prevents a high-energy projectile from spreading the individual tows of the unidirectional fabric layers, as the projectile acts to penetrate the material. While entanglement of nonwoven fibers prevents tows from separating, the process also prevents delamination of the individual layers. In addition, this stabilization process increases the density of the material, thereby engaging more fibers per unit volume. In preferred embodiments, a nonwoven layer is attached on one side of a stack of fabric layers by needlefelting; however a ready-to-use ballistic material according to the invention may have nonwoven layers attached on both sides thereof.

The thickness of the finished material is not particularly limited and may range from about 0.025 in. (0.0635 cm) to about 4.0 in. (10.06 cm), preferably from about 0.10 in. (0.254 cm) to about 2.0 in. (5.03 cm), depending on the end use and the desired number of woven fabric layers. The number of woven fabric layers (including unidirectional or quasi-unidirectional layers) in a stack is likewise determined by the type of woven layers used and the end use. More than two, for example four to five hundred, and preferably four to twenty layers of woven fabric attached to a nonwoven layer is appropriate to form a core material for many life protection systems applications. In embodiments, a first stack having a plurality of woven layers and a nonwoven layer on a face thereof is prepared by needle punching, and a second stack having similar construction is prepared. The first stack and the second stack may be then needlepunched together so that the nonwoven layers face opposite sides of the material.

The needle felting of the nonwoven layer or layers and the stack of woven layers must be varied according to the woven fabric type. The variation of the needling process may include the amount of needle punches per unit area and/or the depth of those punches. The optimal amount and type of needling, and the amount of nonwoven fiber can be determined by ballistic testing, preferably performed using standard ballistic testing procedures, such as Military Standard (Mil Std) 662 F or National Institute of Justice (NIJ) Standard 0104.04, which are herein incorporated by reference.

For example only and not by way of limitation, materials according to the Examples herein were prepared by placing nonwoven material (which may be manufactured, for example, by dry laid carding and mechanical needling) having an areal weight of about 2.5 oz/sq.yd. (84.78 g/m$^2$) and a thickness of about 0.060 in. (0.152 cm) at the inlet side of a needlepunch loom on an automatic roll feed system timed to feed the material at the same rate as the machine speed. Layers of quasi-unidirectional woven materials were arranged in a stack configuration on the inlet side of the needlepunch loom. The leading edge of the woven layers were then tacked together to a leader fabric (a fabric used solely to bring another material through the needlepunch loom) for stability. The nonwoven fabric was fed to the needlepunch loom edge and the entire system of nonwoven and woven materials was fed into the needlepunch loom for consolidation. The step of superposing a nonwoven layer on a stack of woven layers includes placing a nonwoven layer above the stack of woven layers on the loom. Layers of nonwoven fabric may be interleaved between layers of woven fabric.

The first pass through the needlepunch loom used 400 penetration/sq.in. (62 penetrations/cm$^2$) with an 8 mm penetration of needle into the materials. The type of needle used is a finishing needle. The machine ran at 1.6 yards/minute (1.46 m/min.). The consolidated material is then run through the loom a second time with the nonwoven component remaining face-up. The second pass is to ensure that all of the woven layers are mechanically entangled in the z-direction with the nonwoven layer. The second pass through the loom was at 600 penetrations/sq. inch (93 penetrations/cm$^2$) with an 8 nm penetration of needle into the materials. For this pass, the machine ran at 2.0 yards/minute (1.83 m/min.).

As a result, the nonwoven layer was firmly attached to the woven layers and the finished material was ready for use in the manufacture of ballistic articles without requiring assembly of individual layers.

After needle felting, the material may be further consolidated by calendering the needle felted stack through nip rolls. Calendering in a nip roll further densifies the system and reduces the overall thickness profile of the material. Calendering is the process of applying pressure, and sometimes heat, to a material for further densification. The density of a consolidated material is generally increased between 40 to 55 percent and the thickness decreased by between 30 to 35 percent. The combined result of these steps is expected to increase the performance of the system in terms of ballistic testing performed in accordance with NIJ standards for projectile penetration, back face signature, and against fragment simulating projectiles (FSP's). The finished material may further be enhanced by the application of a water repellant treatment, or other coating or treatment.

Methods of mechanical entanglement, other than needlepunching, can be used, such as hydroentanglement, the use of the water or airjets, and the like.

Due to increased ballistic performance of fabrics according to the invention, less material can be used to achieve equivalent ballistic performance making the end products lighter weight, more flexible and thus more comfortable as a ballistic garment. The process adheres individual layers together through the entanglement process, which increases the interlaminar shear strength and communication between adjacent layers during a ballistic event. This effect allows energy from an impacting projectile to be more readily absorbed and evenly distributed throughout the fabric layers.

The thickness and weight of the finished ballistic material vary depending on the amount of fibers used in the nonwoven layer, the degree of needle felting, and the type and number of woven layers in the stack. The format of the product also depends on the intended end use. In conventional ballistic vest apparel, the vest typically consists of multiple layers of woven ballistic grade materials that are then stitched, and in some cases laminated to hold the layers in place. The layers, commonly known as a pack, are then covered with a more wearable dress cover material. In the present invention, the introduction of the insertion of a preassembled core for the ballistic protective component is new. The core is considered the base ballistic protection from which the remaining level of ballistic protection is built. Several cores may be added, as well as other ballistic grade materials known in the art, to obtain the desired ballistic performance of the pack. For a ballistic vest, a core material may be made with a single layer of nonwoven material attached by needlepunching to a stack of woven layers (which is defined to include unidirectional and quasi-unidirectional layers) to form a material having a thickness in a range of about 0.1 in. (0.254 cm) to about 0.3 in. (0.76 cm), typically about 0.25 in. (0.63 cm), which may be cut as a single layer to form a vest.

Generally, an important goal for ballistic materials (particularly wearable materials) is to increase ballistic performance at lighter material weight. A suitable material weight for a core ballistic material is in a range of about 0.07 lbs/ft$^2$ (342 g/m$^2$) to about 10 lbs/ft$^2$ (48.8 kg/m$^2$), and preferably about 0.18 lbs/ft$^2$ (878 g/m$^2$) to about 0.60 lbs/ft$^2$ (2.928 kg/m$^2$). In the most preferred applications, the core ballistic material has a weight of 0.18 lbs/ft$^2$ (878 g/m$^2$) to about 0.321 bs/ft$^2$ (1.562 g/m$^2$).

In addition to the performance benefit, the needling process forms a ballistic core material that does not require further assembly of the layers. For example, if the fabric were used by a ballistic vest manufacturer to create a ballistic vest, the manufacturer may cut a unit of material from a single roll of fabric that has been tested to meet specific ballistic requirements. This method avoids the additional labor of cutting many layers of ballistic fabric, stacking, counting and quilting or stitching layers together. The core material is thus "ready-made" ballistic material, offering economic as well as performance advantages in a single monolithic core material that can then be used as a building block to create various constructions in numerous potential products for both hard and soft armor materials.

The core material made according to the invention has other uses apart from the manufacture of ballistic vests and other ballistic garments. For example, the material may be resinated and used as hard armor or hard composite armor, and in both hard and soft containment structures, bomb containment structures and mitigating panels. The core materials comprising several prefabricated layers provides for ease-of-use in many of these applications.

Conventionally, processing by secondary steps enhances the use of fabric in vests, blankets, and composites, particularly for bullet resistant applications. During a ballistic event, energy is transferred in several directions: orthogonally to the flight of the projectile along the yarns of the fabric layer and simultaneously longitudinally to the path of the projectile into the pack. This longitudinal energy transfer occurs before the projectile penetrates the fabric layer. This transfer of energy into the pack plays a significant role in stopping the projectile The layers of fabric must be in intimate contact for efficient longitudinal energy transfer. Therefore, the fabric layers are conventionally processed to maintain this contact. The secondary step(s) are also used to stiffen the ballistic pack and/or to reduce or spread the energy (blunt trauma) that is transferred to the body during the stop of a ballistic threat. Fabric subjected to a ballistic event is pushed back into a cone shape by the projectile during impact. The cone has a larger surface area than the initial flat surface, and the secondary processing permits the fabric to spread open in order to cover the increased area. Such conventional secondary processing steps also help to prevent the fabric layers from opening up during the ballistic event. Conventional secondary steps that may be used include sewing and/or lamination of the fabric layers. The use of core technology according to the invention replaces these conventional secondary steps by increasing the intimate contact between the layers. In addition, the core technology provides this contact in a more efficient manner. The mechanical entanglement of the core technology not only provides contact between fabric layers, but also increases contact between the tows within each fabric layer. However, in some applications conventional secondary processes, including sewing and/or lamination, may be used in combination with mechanical entanglement.

Coatings known in the art, such as a water repellant polytetrafluoroethylene coating, may advantageously be applied to the finished fabric to improve the performance.

The following fabrics were prepared according to the invention:

EXAMPLE 1

A nonwoven fabric consisting of para-aramid fibers was superposed on eight cross-laid layers of a para-aramid quasi-unidirectional fabric to form a stack. The stack was subjected to needle felting consolidation to obtain a thickness of about 0.11 inches (0.28 cm) and a weight of about 0.24 lbs/sq. ft. (1.171 kg/m$^2$). The resulting material exhibited enhanced ballistic performance when compared to a stack of cross laid layers of quasi-unidirectional fabric of comparable thickness, as demonstrated in the Comparative Examples below.

EXAMPLE 2

A nonwoven fabric consisting of para-aramid fibers was superposed on eight layers of a para-aramid quasi-unidirectional fabric to form a stack. The stack (prior to subsequent steps) had a cumulative thickness of about 0.25 inches. The stack was subjected to needle felting consolidation. Subsequently seven additional woven layers (quasi-unidirectional) and a second nonwoven layer were simultaneously attached to the original stack via needling. The second nonwoven layer was attached to the exposed woven side. Thus, the manufacture is similar to that of Example 1, except that a plurality of stacks of woven fabric and a plurality of nonwoven layers were used. The finished fabric had an areal density of about 0.48 lbs/sq. ft. (2.342 kg/m$^2$), a thickness of about 0.2 in. (0.51 cm).

EXAMPLE 3

A nonwoven fabric consisting of para-aramid fibers was superposed on ten cross-laid layers of a para-aramid plain woven fabric to form a stack The stack was subjected to needle felting consolidation. The finished material had a cumulative thickness of about 0.13 in. (0.33 cm) and a weight of about 0.38 lbs/sq. ft. (1.854 kg/m$^2$). The core material design of this Example is similar to that of Example 1 except that a plain weave woven layer was used.

EXAMPLE 4

A nonwoven fabric consisting of para-aramid fibers was superposed on ten cross-laid layers of a para-aramid plain woven fabric and consolidated by needlepunching to form a first stack similar to the stack of Example 3. A second stack, substantially identical to the first stack, was attached back-to-back with the first stack so that the woven layers were sandwiched between the nonwoven layers. The finished fabric had an areal density of about 0.76 lbs/sq. ft. (3.709 kg/m$^2$) and a thickness of about 0.24 in. (0.61 cm).

EXAMPLE 5

The fabric of Example 1 was further subjected to a calendering step between nip rolls, which carry the material between and through the rolls and out the other side via the force of the rolls. The material density was increased to 43 lb/ft$^3$ (0.69 g/cm$^3$) with a thickness of 0.135 inches (0.34 cm), an increase in density of 50 percent, and a decrease in thickness of 33 percent.

COMPARATIVE EXAMPLES

A woven/nonwoven material configuration combined via mechanical needling according to the invention was compared to three standard ballistic materials which were prepared using the same woven material and different consolidation methods, for ballistic performance. Ballistic performance was measured using Mil Std 662. V-50, V-0 and corresponding backface signature results were compared. V-50 is commonly known as the measurement of the velocity at which fifty-percent of the projectiles fired penetrate the ballistic material under evaluation. V-0 is commonly known as the measurement of the velocity at which zero percent of the projectiles fired penetrate the ballistic material under evaluation. Backface signature measurements are determined by recording the depth at which the material penetrates into a clay backstop. NIJ has determined that a backface signature of 44 mm or less is considered survivable.

Comparative Example 1

An "x-stitch" was used to combine individual layers of Sentinel® quasi-unidirectional woven fabric. The total weight of the material was about 0.5 lbs/sq. ft. (2.44 kg/m$^2$).

Comparative Example 2

A 1-inch quilt stitching was used to combine individual layers of Sentinel® quasi-unidirectional woven fabric. The total weight of the material was about 0.5 lbs/sq. ft. (2.44 kg/m$^2$). This quilted format is the typical design of conventional ballistic fabrics.

Comparative Example 3

Layers of Sentinel® quasi-unidirectional woven fabric were adhered to one another using a polymeric laminate. Heat was then applied to the total laminate structure to create the final consolidated material. This material is rigid and weighs 0.5 lbs/sq. ft. (2.44 kg/m$^2$).

Inventive Example

A needle punched nonwoven layer was used to combine a stack of Sentinel® quasi-unidirectional woven fabric to obtain a total weight of about 0.5 lbs/sq. ft. (2.44 kg/m$^2$). The core compounds were formed using the method described in Example 1.

Table 1 lists the performance of Comparative Examples 1 through 3 compared to the Inventive Example for both the V-50 value, in feet per second, and the backface signature, in millimeters. The fabric according to the invention performs better than the Comparative Examples 1 through 3 for both V-50 and backface signature. Although Comparative Example 2 performs nearly the same for V-50, the quilt stitched material is more cumbersome to manufacture and has an unsatisfactory backface signature. Comparative Example 3 exhibited fair performance but Comparative Example 3 is a rigid material that does not conform to the body.

TABLE 1

| Sample | Stitching | Areal Density lbs/sq. ft. | Projectile | Results V-50 (fps|m/s) | Backface (mm) |
|---|---|---|---|---|---|
| Comp. Ex. 1 | x-stitch | 0.5 | 9 mm | 990|302 | 70 |
| Comp. Ex. 2 | 1 inch quilt | 0.5 | 9 mm | 1241|378 | 52 |
| Comp. Ex. 3 | None | 0.5 | 9 mm | 1115|340 | 40 |
| Inventive Ex. | None | 0.5 | 9 mm | 1264|385 | 34 |

Table 2 shows the percentage improvement for the Inventive Example versus each of the Comparative Examples.

TABLE 2

| | % Improvement | |
|---|---|---|
| | V50 | Backface |
| Comp. Ex. 1 | 28% | 62% |
| Comp. Ex. 2 | 27% | 35% |
| Comp. Ex. 3 | 12% | 15% |

Figure 2:
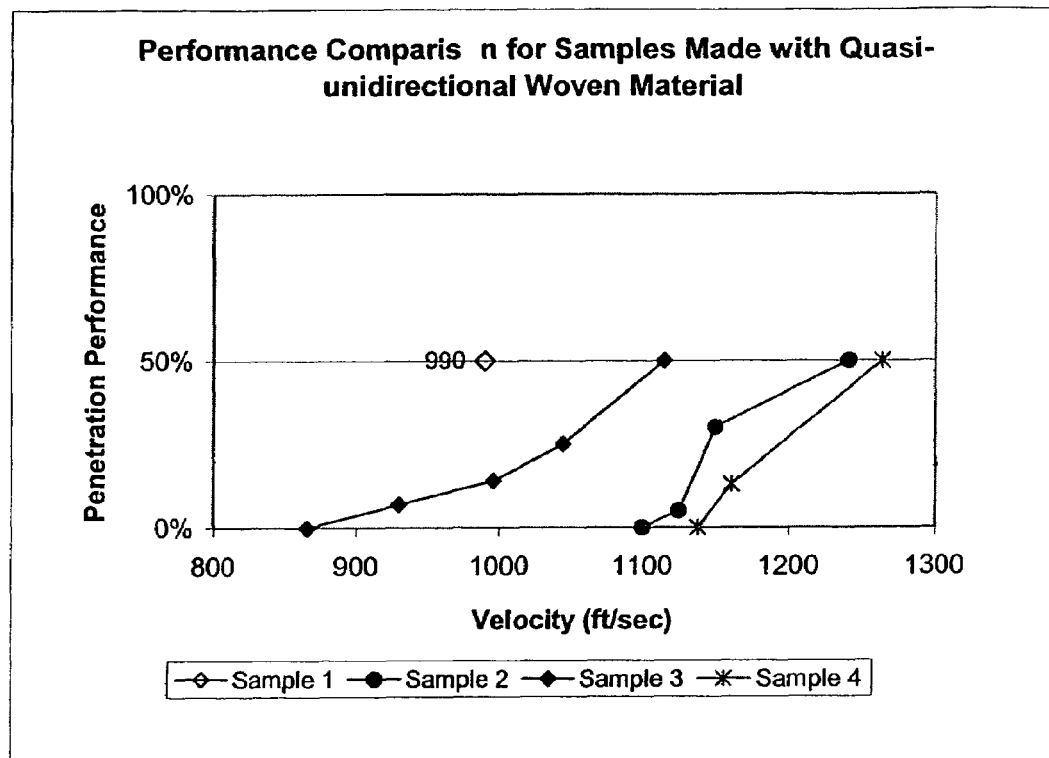
FIG. 2 is a graph showing the performance of ballistic materials according to the invention compared to prior art ballistic materials.

FIG. 2 displays a graphical interpretation of the V-0 to V-50 results for Comparative Examples 2 and 3 and the Inventive Example, showing the advantage of the needle punch consolidation versus conventional consolidation methods. The material incorporating needling technology enhances and improves the ballistic performance as shown from the V-0 to V-50 data.

Generally the slope of the performance curve for traditional woven ballistic materials is shaped like an "S". This is seen for Comparative Example 2, which is a conventional ballistic material design. Comparative Example 3, which is a rigid material, would not be expected to have the S shaped profile. Depending on the type of material, the slope of the V-0 to V-50 curve can be gradual or steep. A gradual "S" shape makes the true and consistent V-0 value of a given design difficult to state accurately and is therefore less preferable. As shown in FIG. 2, the use of needling technology according to the invention increases the slope of the curve, which allows a more accurate and reliable statement of V-0. This change in the slope also is an indication of the change in consistency of the materials used to build the technology. The slope of the curve for the needled materials shows an increased consistency in the overall material construction for the Inventive Example.

The foregoing examples and detailed description are not to be deemed limiting of the invention which is defined by the following claims. The invention is understood to encompass such obvious modifications thereof as would be apparent to those of ordinary skill in the art.

What is claimed is:

1. A ballistic material comprising a stack of woven layers, and at least one nonwoven batting layer on a face of said stack of woven layers, said nonwoven layer attached to and entangled with the stack of woven layers by needlepunching to form an integral material having an areal weight of about 0.07 pounds per square foot (342 g/m$^2$) to about 10 pounds per square foot (48.8 kg/m$^2$).

2. The ballistic material of claim 1, comprising a non woven layer on each face of said stack of woven layers.

3. The ballistic material of claim 1, wherein the stack of woven layers comprises 4 to 20 quasi-unidirectional aramid fiber fabric layers cross laid at right angles.

4. The ballistic material of claim 1, wherein the nonwoven layer consists essentially of fibers having a tenacity of at least about 15 grams per denier (13.5 g/decitex) and a tensile modulus of at least about 400 grams per denier (360 g/decitex).

5. The ballistic material of claim 1, having a backface signature of less than 44 mm at a material areal density of 0.5 pounds per square foot (2.44 kg/m$^2$).

6. The ballistic material of claim 1, calendered to a thickness of about 0.1 inches (0.254 cm) to about 0.3 inches (0.76 cm) having an areal density of 0.18 pounds per square foot (878 g/m$^2$) to about 0.60 pounds per square foot (2.928 kg/m$^2$).

7. A ballistic material comprising at least one woven layer of ballistic grade fiber and at least one nonwoven fiber layer of batting, said nonwoven batting layer entangled with the woven or unidirectional layer in a direction substantially perpendicular to an x-y plane of the ballistic material.

8. The material of claim 7, wherein said nonwoven layer is entangled with the woven layer by needlepunching.

9. The material of claim 7, wherein said woven layer comprises unidirectional or quasi-unidirectional ballistic grade fibers.

10. The material of claim 7, wherein said at least one nonwoven layer comprises ballistic grade fibers.

11. The material of claim 7, wherein said at least one nonwoven layer comprises staple para-aramid fibers.

12. The material of claim 7, comprising a plurality of layers of unidirectional tows of ballistic grade fibers cross-laid at 90 degree angles.

13. The material of claim 7, comprising a plurality of layers of woven ballistic grade fabric.

14. The material of claim 7, comprising a plurality of layers of knitted ballistic grade fabric.

15. The material of claim 7, comprising a plurality of layers of stitched tows of ballistic grade fibers.

16. The material of claim 7, further comprising a water repellent coating.

17. The material of claim 7, having a thickness reduced by calendering.

* * * * *